United States Patent [19]

Göldner et al.

[11] Patent Number: 4,663,537
[45] Date of Patent: May 5, 1987

[54] PROTECTIVE CIRCUIT

[75] Inventors: Walther Göldner, Denkendorf; Horst Kramer, Kirchheim-Teck, both of Fed. Rep. of Germany

[73] Assignee: Keiper Recaro GmbH & Co., Fed. Rep. of Germany

[21] Appl. No.: 748,859

[22] Filed: Jun. 26, 1985

[30] Foreign Application Priority Data

Jul. 3, 1984 [DE] Fed. Rep. of Germany ....... 3424365

[51] Int. Cl.[4] .............................................. H02H 3/08
[52] U.S. Cl. ..................................... 307/10 R; 307/9; 361/31; 361/93; 361/18; 318/434
[58] Field of Search ............ 307/10 R, 10 SB, 10 LS, 307/10 AT; 361/28, 23, 21, 22, 30, 31, 33, 34, 56, 57, 75, 79, 83, 86, 87, 89, 90, 91, 92, 93, 94; 340/52 R; 318/434, 410, 445, 317, 359, 342, 635, 71

[56] References Cited

U.S. PATENT DOCUMENTS

| | | | |
|---|---|---|---|
| 3,513,353 | 5/1970 | Lansch | 361/86 X |
| 3,524,124 | 8/1970 | Perkinson | 361/86 X |
| 3,555,359 | 1/1971 | Morris | 361/86 X |
| 3,558,978 | 1/1971 | Nye | 361/28 |
| 3,582,713 | 6/1971 | Till | 361/18 X |
| 3,764,883 | 10/1973 | Staad et al. | 361/86 X |
| 3,988,643 | 10/1976 | Morris | 361/18 |
| 4,019,096 | 4/1977 | Bullinga | 361/86 |
| 4,021,701 | 5/1977 | Davis | 361/18 |
| 4,025,823 | 5/1977 | Lang et al. | 361/92 X |
| 4,177,492 | 12/1979 | Noddings et al. | 361/31 |
| 4,268,884 | 5/1981 | Ford et al. | 361/22 |
| 4,453,115 | 6/1984 | Yoshida | 318/434 |
| 4,517,502 | 5/1985 | Aschoff et al. | 318/445 X |
| 4,547,715 | 10/1985 | Li | 361/31 X |

Primary Examiner—William M. Shoop, Jr.
Assistant Examiner—Shik Luen Paul, Ip
Attorney, Agent, or Firm—Wigman & Cohen

[57] ABSTRACT

A protective circuit for a manually controllable adjusting device for motor vehicle seats, which is driven by an electric motor, has a current sensor (11) with an output voltage which corresponds to the sum of all instantaneous currents flowing in the motor electrical circuit of the adjusting device. Furthermore, a threshold switch stage (14, 16, 24, 25, 26) which responds to a predetermined value of the output sensor (11) and a switch (12) which lies in the electrical circuit of the electric motor are provided. This switch (12) can be switched from its closed condition into its opened condition by the threshold switch stage when a threshold value is exceeded.

9 Claims, 2 Drawing Figures

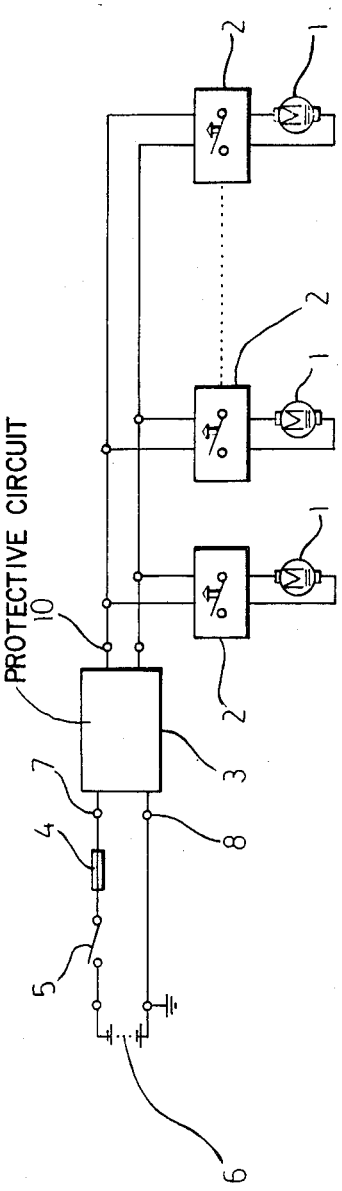
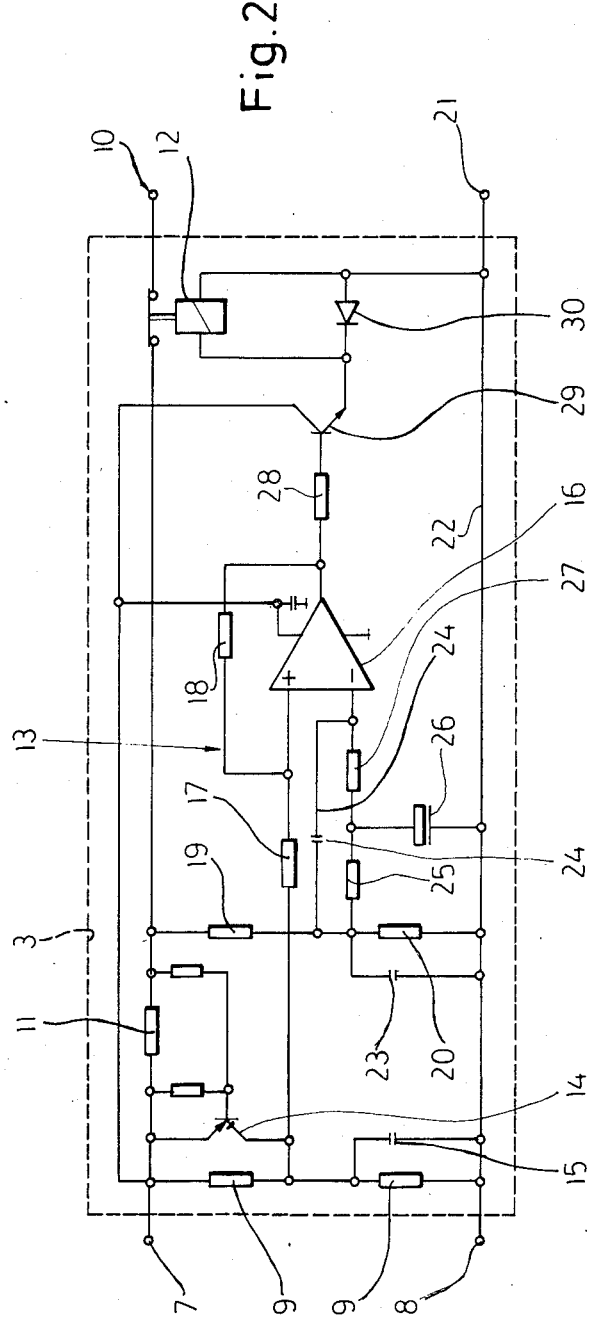

PROTECTIVE CIRCUIT

BACKGROUND OF THE INVENTION

The invention relates to a protective circuit for at least one manually controllable adjusting device for vehicle seats which are driven by an electric motor.

In the known adjusting devices of this type, fuses are used to protect electric motors, conductors and switches. The protection attained thereby, however, is unsatisfactory, not only in seats having multiple adjusting devices necessitating separate protection of each motor, but even in cases where only a single adjusting device is present. The response value of the fuses must be selected so that the fuses respond, requiring their replacement, as seldom as possible. Therefore, relatively high currents can occur which can result in high thermal loads, which, in adjustment devices having an adjustment path limited by a stop, can also result in high mechanical loads because of the high rest torque of electric motors. The high currents also result in the fact that, in cases involving multiple adjusting devices where it is desired to avoid conductors having an extraordinarily large cross section, the electrical circuits of the individual electric motors must also be formed with separate conductors in those sections that are common to all of the electrical circuits. Above all, this complicates the placement and installation of the conductors leading to the manually activatable switches often found at the side of seats. The above-described problem could be solved by mutually, mechanically locking the manually activatable switches associated with the individual adjusting devices in such a manner that only a single switch can be activated at any given time. However, switches of this type are expensive and subject to malfunction. In addition, a simultaneous activation of two adjusting devices, such as is often necessary for an adjustment of the seat height, is precluded.

SUMMARY AND OBJECTS OF THE INVENTION

The object of the invention is to create a fuse-free protective circuit for at least one manually controllable adjusting device for vehicle seats that are driven by an electric motor, which, despite an expense that is as low as possible, makes it possible to adapt the current limitation to specified values.

Because the response value of a threshold switching stage can be adjusted very precisely to a desired value using simple means, and the output voltage of the current sensor is always applied to the input of the threshold switching stage, the maximum permissible current can be established. When this value is exceeded, the current flow can be interrupted with great precision. Because this interruption takes place by means of a switch which can again automatically close the electrical circuit as soon as the output voltage of the current sensor no longer exceeds the upper limiting value, no activities need be performed by a person in order to make the adjusting device or devices again functionable. This circumstance makes it possible to set the current limiting value much lower than in a protection system using a fuse, because a brief current interruption, which is again automatically eliminated, can be tolerated. The protective circuit according to the invention therefore permits the electric motor or motors, as well as the switches and conductors, to be reliably protected against a thermal overload. In addition, by means of the current limit, the rest torque of each monitored electric motor can be precisely limited, so that the force exerted on the stop that limits the adjustment range when the motor at the end of the adjustment path cannot be immediately shut off, can be reliably limited. Since, as a rule, the current limit can be adjusted to a value higher than the current consumption of two simultaneously engaged adjusting devices undergoing adjustment movements, the protective circuit according to the invention can be used even if numerous adjusting devices must be protected and the simultaneous operation of at least two adjusting devices is requested. The current limitation can then, for example, be adjusted in such a manner that a disconnection only occurs when two of the electric motors simultaneously take their startup current or when the seat user attempts to engage three or more adjustment devices simultaneously. Because of a current limitation of this type, it is thus also possible to use conductors having the usual cross-sectional size wherever all electrical circuits have a section in common, without having to fear a thermal overload in these conductors. In addition, the necessity is removed of having to lock the switches associated with the individual adjusting devices. The automatic interruption of all electrical circuits of the electric motors when an upper limiting value is reached does not inhibit comfort during a setting or adjustment of the seat, as a rule, an optimal seat adjustment is much easier to achieve when the individual adjustment possibilities are utilized in succession.

In a preferred embodiment a delay circuit is provided, in order to prevent that a brief current peak, which can occur for example when an electric motor is engaged, and which, because of its short duration, would not cause a fuse to respond despite a peak value lying above the upper limiting value of the current, will cause the threshold switch stage to respond. The time delay necessary for this purpose is so slight that it does not have a detrimental effect on the opening of the electrical circuit of the electric motor, if the cause is other than a brief current peak.

In one preferred embodiment, this delay circuit also delays the return of the threshold switch stage to the original switch condition after a response due to a current in excess of the limiting value, into which condition, without the effect of the delay circuit, it would again revert without any delay as soon as the electrical circuit is interrupted and the output voltage of the current sensor directs the original switch condition. The delay in the return to the original switch condition thereby can be selected to be large enough so that each of the electric motors that has experienced a strong heating because of a high current consumption can be cooled sufficiently to permit an adjusting movement without the thermal protection switch usually associated with each of the electric motors first responding. When the adjusting devices are activated unnecessarily often, the protective circuit according to the invention therefore also assists in keeping the number of times the thermal protection switch responds so low that they have a sufficiently long service life. Simultaneously, the electric motors are also protected against a thermal overload, which also materially contributes to a malfunction-free operation of the adjusting devices over long periods of time.

In a preferred embodiment a second control stage is provided for the threshold switch stage which generates an output signal, the value of which changes in one direction during the flow of current in the motor current circuit and in the other direction during each pause in the current. A disconnection can be begun by means of this second control stage, i.e., the electrical circuit of the electric motor can be interrupted, if, based on the output signal of the second control stage, it must be assumed that the electric motor has reached the upper limit of its thermal capacity. In this manner the thermal protection switch is also prevented from responding, which is advantageous not only to protect this switch, but also to shorten the waiting period until the motor can again be turned on, because this waiting period is longer with a response of the thermal protection switch than when the interruption in the current takes place previously. This is also advantageous for cases where, as a result of high temperatures in the vehicle, the thermal switches already have a relatively high initial temperature. These advantages of the protective circuit according to the invention result even when two or more adjusting devices are connected to the current path monitored by the protective circuit.

Preferably, after the threshold switch stage responds to a switch signal from the second control stage, the threshold switch stage switches back into the original condition automatically after a predetermined period, in order to enable the adjusting device to again be activated. It is effective to select this time period so that the seat user does not feel the interruption to be disturbingly long, and yet the electric motor can cool sufficiently to allow the next adjustment to be performed. These purposes of the second control stage can be realized with a particularly low expense with the aid of an RC member, because this member performs the necessary integration of the current over time and can also effect the necessary delay before the circuit is again closed.

In one preferred embodiment the threshold switch of the threshold switch stage is formed by an operations amplifier. With an operations amplifier a constancy in the switch conditions can be achieved at a relatively low expense even in a very large temperature range. In addition, with an operations amplifier the expense for the realization of a switch delay is also low. Finally, an operations amplifier is also suited as a threshold switch for the protective circuit according to the invention by means of the fact that its two inputs simplify a control using two control stages.

Because the second control stage must have a relatively large time constant with respect to the relatively slow change in temperature in the electric motor, and therefore its output voltage practically does not react to rapid current changes or jump-like changes in line voltage, in a preferred embodiment a circuit is provided which adds a voltage to the output voltage of the second control stage with practically no delay, which additional voltage corresponds to a rapid increase of the current or a jump-like change in the line voltage and, at an appropriate value, causes the threshold switch to respond. A circuit of this kind can be realized with a condenser, so that the expense is extremely low. The advantage of this supplement to the second control stage is that high current loads from the electric motor are protected against when the motor already has a relatively high temperature, and that at a relatively low line voltage, such as can occur with a poorly charged battery, the battery receives a certain recovery pause before it can again be loaded by the adjusting devices.

The invention is described in greater detail below with the aid of an exemplary embodiment for a motor vehicle seat having multiple adjusting devices as illustrated in the drawings. With the same design, the protective circuit could also be used in connection with a single adjusting device.

BRIEF DESCRIPTION OF THE DRAWINGS

FIG. 1 is a circuit diagram of the electrical circuit of the adjusting devices containing the exemplary embodiment of the protective circuit according to the invention; and FIG. 2 is a circuit diagram of the exemplary embodiment of the protective circuit according to the invention.

DETAILED DESCRIPTION OF A PREFERRED EMBODIMENT

Numerous adjusting devices for a motor vehicle seat, which for example make it possible to adjust the seat height and seat inclination as well as the inclination of the back rest and the seat as a whole in the longitudinal direction of the vehicle, are each driven by respective current motors 1, which are turned on in one rotational direction or the other by means of a manually activatable pole reversing switch 2 for the period during which the pole reversing switch 2 is held in the activated condition. All of the pole reversing switches 2 are connected in parallel to the output of a protective circuit designated generally with the numeral 3. All of the pole reversing switches 2 can be activated independently by each other, so that all of the direct current motors 1 or any desired combination thereof can be turned on simultaneously. The protective circuit 3 is connected to the vehicle battery 6, which feeds the vehicle wiring, by means of a common fuse 4, which in the exemplary embodiment has a response value of 32 A, and an ignition lock switch 5.

As shown in FIG. 2, a voltage divider formed from two equally large resistors 9 lies between the input terminal 7 of the protective circuit 3, which is connected to positive potential, and the input terminal 8, which is connected to ground. A reference voltage is picked up from the center of this voltage divider. In the conductor leading from the positive input terminal 7 to the corresponding output terminal 10, there are arranged an ohmic resistor, which serves as a current sensor 11, and the switch section of a relay 12. The resistance value of the current sensor 11 is selected so that the voltage applied thereto drops slightly, but sufficiently to control a following threshold switch stage 13, whenever one of the direct current motors 1 is turned on. The current capacity of the current sensor 11 is rated according to the maximum constant current.

A voltage divider formed from two resistors of different sizes lies in parallel to the current sensor 11, and the base of a p-n-p transistor 14 is connected to the pick-up of this voltage divider. The emitter-collector section of this p-n-p transistor 14 is connected in parallel to the resistor 9 lying between the pick-up and the positive input terminal 7. In order to avoid disruptions in the reference voltage, a condenser 15 is connected in parallel to the other resistor 9. The threshold switch stage 13 contains an operations amplifier 16 of the type 741 as a threshold switch. The positive input of this operations amplifier 16 is connected by means of a coupling resistor 17 with the pick-up of the voltage divider formed by the resistors 9. A return coupling from the output of the operations amplifier 16 to its positive input is provided by means of a resistor 18. Between the current sensor 11 and the relay 12, one resistor 19 of a voltage divider is connected to the conductor leading from the positive input terminal 7 to the corresponding output terminal 10, and the other, somewhat larger resistor 20 is connected with the grounded conductor 22 leading from the input terminal 8 to the output terminal 21. The resistor 19 in the exemplary embodiment has a value of 9.4 KOhm, and the resistor 20 has one of 10 kOhm. To suppress disruptions, a condenser 23 is connected in parallel to the last-named resistor. In addition, an RC-member is connected in parallel to the resistor 20, which RC-member has a resistor 25 connected to the pick-up and a condenser designated with the numeral 26. The voltage to which the condenser 26 is charged is applied to the negative input of the operations amplifier 16 by means of a coupling resistor 27. In addition, the condenser 24 is connected with this input and is connected at its other side with the pick-up of the voltage divider formed by the resistors 19 and 20.

The output of the operations amplifier 16 is connected with the base of a switch transistor 29 by means of a resistor 28, which switch transistor 29 lies in the energizing circuit of the relay 12, the switch section of which is closed when at rest and is open when the relay is energized. A diode 30 lies in parallel with the excitation spool of the relay 12 to protect the switch transistor 29.

If the ignition lock switch 5 is closed, thereby applying voltage to the input terminals 7 and 8 of the protective circuit 3, then, because the condenser 26 becomes charged only gradually, initially, the potential applied to the positive input of the operations amplifier 16 is higher than that at the negative input. The operations amplifier thereby changes its switch condition with a slight delay conditioned on the return coupling and thereby makes the switch transistor 29 conductive, which results in the relay 12 being excited and interrupting the electrical circuit of the motor 1. Not until approximately three seconds have elapsed is the condenser 26 sufficiently charged so that the potential at the negative input of the operations amplifier 16 is larger than the potential at the positive input by an amount sufficient for a switching into its other switch condition. The adjusting device is therefore not operational until after this period, which precludes disturbances as a result of the start-up process, for example the starting of the motor 1.

If the current flowing through the current sensor 11 rises as a result of the turning on of the motor 1 to a value which would equal or even exceed the limiting value established, for example, at 28, then the transistor 14 becomes completely or at least partially conductive so that the potential at the pick-up of the voltage divider formed by the two resistors 9 and thereby also the potential at the positive input of the operations amplifier 16 rises enough that the operation switch 16 switches and thus effects an excitation of the relay 12, which leads to an interruption of the electrical circuit of the motor 1. Because the cut-off threshold lies below the response current of the fuse 4, the current sensor, the first control circuit of the operations amplifier 16 forming the threshold switch and which contains the transistor 14, and the switch formed by the relay 12 prevent the occurrence of an excess current. A short current peak, such as can occur for example when the motor 1 is turned on, however, does not lead to a switching of the operations amplifier 16, even if the peak value lies above the established limiting value, at which a load cut-off would be caused, because a current peak of this type is not harmful and also does not cause the fuse 4 to respond. This is achieved by means of the fact that the operations amplifier 16 responds with a slight delay because of its inner wiring and the return coupling, which delay is selected to be larger than the maximum duration of a current peak.

As soon as the relay 12 has interrupted the electrical circuit when the upper limiting value of the current is reached, the transistor 14 reverts back into the non-conductive condition, which causes the potential at the positive input of the operations amplifier 16 to sink back to the rest value. After a delay of about 3 seconds, the operations amplifier 16 returns back into the original condition, which is also achieved by means of the return coupling and a corresponding inside wiring as well as the coupling resistor 17. If a new current flows which reaches or exceeds the upper limiting value, then the electrical circuit of the motor 1 is again interrupted for the selected period of, for example, 3 seconds. The user of the seat is thus forced to release the pole reversing switch 2, in order to be able to perform the desired adjustment through a new activation.

If the current limiting switch 3 is operational, the condenser 26 or the RC-member is charged sufficiently that the potential at the negative input of the operations amplifier 16 is slightly higher than at the positive input. Then, if a current flows through the current sensor 11 because the motor 1 has been turned on, the potential is reduced at the pick-up of the voltage divider formed by the resistors 19 and 20, which leads to a discharge of the condenser 26. The time constant of the RC-member is selected so that the potential at the negative input of the operations amplifier 16 does not sink to a value that would cause a switching to occur until the motor 1 has been turned on for a period of time that is somewhat longer than that required for an adjustment from one end of the adjustment range to the other. If the adjusting device reaches its end position after only a short time without the associated motor 1 being turned off, then because of the increased voltage drop at the current sensor 11, the condenser 26 discharges more rapidly. The time constant with which the discharge takes place is selected so that an interruption of the electrical circuit takes place before the motor reaches such a higher thermal load that its thermal protection switch responds.

Because the condenser 26 recharges according to the time constants after an interruption in the electrical circuit of the motor 1, after a certain time the potential at the negative input of the operations amplifier 16 again reaches the value necessary for a switching into the original condition. This time period becomes larger, the more severely the condenser 26 was discharged, the longer a current flow was present and the higher was the current. The motor can thus be cooled longer, the higher the previous load. This also contributes to the motor 1 not being overloaded thermally. In addition, it is thus assured that after a relatively short interruption of a few seconds, the adjusting device is again operational. Sudden increases in the current are taken into account with the aid of the condenser 24, which lowers the potential delivered from the condenser 26 even further, the larger the increase in the current, so that even such rapid changes in current are satisfactorily taken into account in the overload protection. The second control switch of the operations amplifier 16 formed by the RC-member and the condenser 24 thus makes the protective circuit into a variable overload protection having integral regulating behavior and the time-limited discharge capability, whereby the maximum value is adjustable and, for example, lies 26% below the limiting value at which an overload cut-off occurs. The motor is protected against thermal overload even when a discharge takes place over a longer time period without reaching the upper limiting value, but, rather, for example, lies at a value of only 50% of this limiting value. It is therefore possible to use a motor having a relatively short operating period, because the motor will not be overloaded thermally even under longer periods of operation.

What we claim is:

1. A protective circuit for at least one manually controllable adjusting device for motor vehicle seats driven by an electric motor, said protective circuit connecting a power source to said electric motor, comprising:

a current sensor having an output voltage that corresponds to the current or the sum of all instantaneously flowing currents;

a threshold switch stage means, including a threshold switch, which responds to a predetermined value of the output voltage of the current sensor;

a first control stage means for the threshold switch, which produces an output signal for the control of the threshold stage means when current is flowing to the electric motor, which output signal changes value when the predetermined value is exceeded; and an output switch in the protective circuit connecting the power source to the electric motor, wherein said output switch is switched from a closed condition into an opened condition by the threshold switch stage means when a threshold value is exceeded.

2. The protective circuit according to claim 1, wherein the threshold switch stage means, in addition to said threshold switch, includes a second control stage means that controls said threshold switch stage means, wherein said second control stage means is controlled by the output voltage of the current sensor.

3. The protective circuit according to claim 2, wherein the threshold switch is an operations amplifier.

4. The protective circuit according to claim 1, further comprising a delay circuit which releases the switching of the output switch in the protective circuit with a time delay.

5. The protective circuit according to claim 4, further comprising a delay circuit for delay of the switching of said output switch in response to a brief current peak, appearing in said protective circuit, wherein said switch delay subsequent to said brief current peak, has a predetermined value of a few seconds.

6. The protective circuit according to claim 5, wherein the delay circuit is formed by a portion of the circuit and the wiring of the operations amplifier.

7. The protective circuit according to claim 3, wherein the second control stage means contains a transistor which controls the potential at the input of the operations amplifier, which transistor is controlled by the output voltage of the current sensor.

8. The protective circuit according to claim 7, further comprising a second control switch which has an RC-member connected to a voltage divider, wherein the voltage potential at the connection of said RC-member to said voltage divider changes according to the difference between the vehicle line voltage and the output voltage of the current sensor.

9. The protective circuit according to claim 8, wherein the connection point between the resistor and the condenser of the RC-member is connected with one input and the output of the second control stage means is connected with the other input of the operations amplifier.

* * * * *